US011803783B2

(12) United States Patent
Dekusar et al.

(10) Patent No.: US 11,803,783 B2
(45) Date of Patent: Oct. 31, 2023

(54) DYNAMIC VEHICLE PARKING ASSIGNMENT WITH USER FEEDBACK

(71) Applicant: INTERNATIONAL BUSINESS MACHINES CORPORATION, Armonk, NY (US)

(72) Inventors: Anton Dekusar, Castleknock (IE); Bei Chen, Blanchardstown (IE); Claudio Gambella, Phibsborough (IE); Martin Mevissen, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 17/456,699

(22) Filed: Nov. 29, 2021

(65) Prior Publication Data
US 2023/0169410 A1 Jun. 1, 2023

(51) Int. Cl.
*G06Q 10/02* (2012.01)
(52) U.S. Cl.
CPC ......... *G06Q 10/02* (2013.01); *G06Q 2240/00* (2013.01)
(58) Field of Classification Search
CPC ............................ G06Q 10/02; G06Q 2240/00
See application file for complete search history.

(56) References Cited

U.S. PATENT DOCUMENTS

| 6,426,807 | B1 | 7/2002 | Kawai |
| 7,714,742 | B1 | 5/2010 | Noworolski |
| 8,217,806 | B2 | 7/2012 | Kim |
| 8,589,065 | B2 | 11/2013 | Scofield |
| 9,984,572 | B1 | 5/2018 | Newman |
| 10,713,944 | B2 | 7/2020 | Enrique |

(Continued)

FOREIGN PATENT DOCUMENTS

ES 2640294 T3 11/2017

OTHER PUBLICATIONS

Noor et al., ParkBid: An Incentive Based Crowdsourced Bidding Service for Parking Reservation, 2017 IEEE 14th International Conference on Services Computing, pp. 60-67 (Year: 2017).*

(Continued)

*Primary Examiner* — Rupangini Singh
(74) *Attorney, Agent, or Firm* — Robert R. Aragona

(57) ABSTRACT

An embodiment for dynamically assigning vehicle parking is provided. The embodiment may include receiving one or more preferences regarding parking. The embodiment may also include in response to determining a detector vehicle detects a vacant parking spot, creating a network of vehicles within a pre-defined threshold of the vacant parking spot. The embodiment may further include notifying each vehicle in the network about the vacant parking spot and receiving one or more requests for the vacant parking spot from one or more requestor vehicles. The embodiment may also include identifying real-time information associated with roads within the pre-defined threshold of the vacant parking spot. The embodiment may further include assigning the vacant parking spot to a particular requestor vehicle in the network of vehicles. The embodiment may also include displaying an indicator placed adjacent to the particular requestor vehicle that is assigned the vacant parking spot.

17 Claims, 7 Drawing Sheets

(56) References Cited

U.S. PATENT DOCUMENTS

| | | | |
|---|---|---|---|
| 10,752,238 B2 | 8/2020 | Kiyokawa | |
| 10,789,846 B1* | 9/2020 | Vallance | G06Q 10/02 |
| 2006/0267799 A1 | 11/2006 | Mendelson | |
| 2011/0140922 A1* | 6/2011 | Levy | G01C 21/3685 |
| | | | 340/932.2 |
| 2015/0130641 A1 | 5/2015 | Rahman | |
| 2017/0118307 A1 | 4/2017 | Beaurepaire | |
| 2018/0025640 A1 | 1/2018 | Micks | |
| 2019/0139410 A1* | 5/2019 | Guseynov | G08G 1/0133 |
| 2020/0143682 A1 | 5/2020 | Chow | |
| 2020/0258386 A1* | 8/2020 | Lu | G08G 1/148 |

OTHER PUBLICATIONS

Balzano et al., DiG-Park: a smart parking availability searching method using V2V/V2I and DGP-class problem, 2017 31st International Conference on Advanced Information Networking and Applications Workshops, pp. 692-701 (Year: 2017).*

Parker, "Mobile App", Overview, printed Aug. 31, 2021, 1 page, https://www.parker.com/portal/site/PARKER/menuitem.4a7ba99b3c73ae7cc39acea5427ad1ca/?vgnextoid=516610387226b310VgnVCM100000200c1dacRCRD&vgnextchannel=ddf210387226b310VgnVCM100000200c1dacRCRD&vgnextfmt=EN&vgnextcat=Mobile+App&relatorId=c4c610387226b310VgnVCM100000200c1dac.

Parknav®, "Find Real Time On-Street and Off-Street Parking", printed on Aug. 31, 2021, 9 pages, https://parknav.com/.

Zhao et al., "IPark: Location-Aware-Based Intelligent Parking Guidance over Infrastructureless VANETs", Hindawi Publishing Corporation, International Journal of Distributed Sensor Networks, vol. 2012, Article ID 280515,12 pages, Nov. 13, 2012.

Mell et al., "The NIST Definition of Cloud Computing", Recommendations of the National Institute of Standards and Technology, NIST Special Publication 800-145, Sep. 2011, 7 pages.

* cited by examiner

DYNAMIC VEHICLE PARKING ASSIGNMENT WITH USER FEEDBACK

BACKGROUND

The present invention relates generally to the field of computing, and more particularly to a system for dynamically assigning vehicle parking with user feedback in a sensor-equipped network.

Vehicles in the modern era have become increasingly intelligent when compared with older counterparts. Many manufacturers make these vehicles with the capability to connect to the Internet, usually by leveraging a cellular mobile network, as well as satellites. In this manner, a user is able to control the vehicle from anywhere in the world via an application on a mobile device or the World Wide Web. For example, the user can start the vehicle remotely and/or unlock the vehicle with the push of a button. Such vehicles may also be equipped with GPS as well as sensors which can detect objects in the vicinity of the vehicle. For example, the vehicle is capable of informing the user (e.g., a driver) that another vehicle is in a "blind-spot" of the user.

SUMMARY

According to one embodiment, a method, computer system, and computer program product for dynamically assigning vehicle parking is provided. The embodiment may include receiving one or more preferences regarding parking from one or more users. The embodiment may also include in response to determining a detector vehicle detects a vacant parking spot, creating a network of vehicles within a pre-defined threshold of the vacant parking spot. The embodiment may further include notifying each vehicle in the network about the vacant parking spot in response to the notification. The embodiment may also include receiving one or more requests for the vacant parking spot from one or more requestor vehicles. The embodiment may further include identifying real-time information associated with roads within the pre-defined threshold of the vacant parking spot. The embodiment may also include assigning the vacant parking spot to a particular requestor vehicle in the network of vehicles. The embodiment may further include displaying an indicator placed adjacent to the particular requestor vehicle that is assigned the vacant parking spot.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
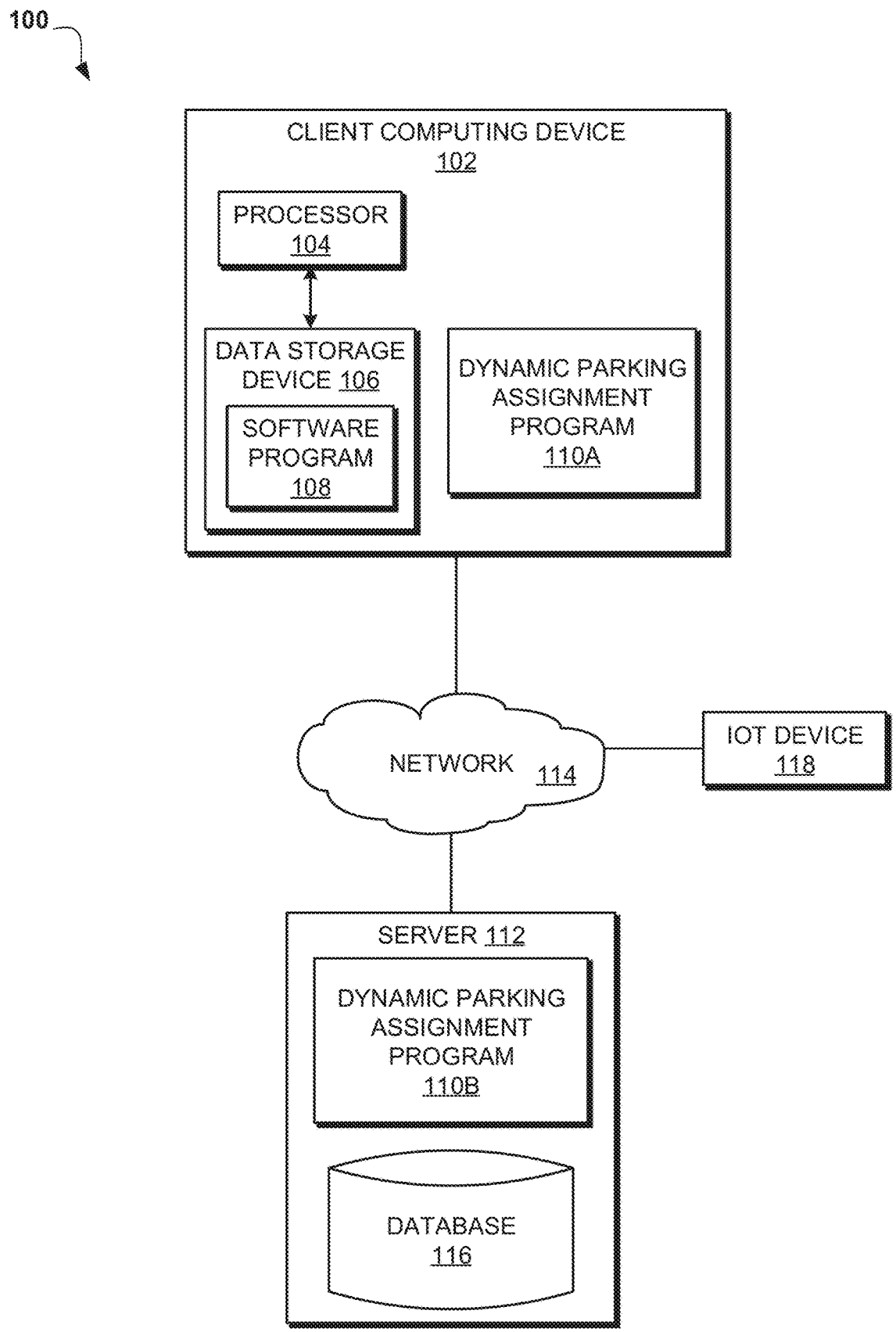
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for dynamically assigning vehicle parking with user feedback in a sensor-equipped network. The following described exemplary embodiments provide a system, method, and program product to, among other things, create a network of vehicles within a pre-defined threshold of a vacant parking spot and, accordingly, assign the vacant parking spot to a particular vehicle based on real-time information and user preferences. Therefore, the present embodiment has the capacity to improve GPS technology and mobile parking prediction applications by dynamically assigning a parking spot to a particular vehicle when that vehicle is in close proximity of the parking spot.

As previously described, vehicles in the modern era have become increasingly intelligent when compared with older counterparts. Many manufacturers make these vehicles with the capability to connect to the Internet, usually by leveraging a cellular mobile network, as well as satellites. In this manner, a user is able to control the vehicle from anywhere in the world via an application on a mobile device or the World Wide Web. For example, the user can start the vehicle remotely and/or unlock the vehicle with the push of a button. Such vehicles may also be equipped with GPS as well as sensors which can detect objects in the vicinity of the vehicle. For example, the vehicle is capable of informing the user (e.g., a driver) that another vehicle is in a "blind-spot" of the user. In a city environment, it is often difficult to find a parking spot and/or charging spot (e.g., for an electric vehicle) for the vehicle. This problem is typically addressed via mobile parking applications that estimate parking availability in a given area based on historical data. However, historical data is inflexible as using historical data fails to account for real-time conditions that may affect parking availability, such as a special event that makes parking spots harder to find than usual. It may therefore be imperative to have a system in place to assign in real-time a parking spot to a particular vehicle when that vehicle is in close proximity of the parking spot. Thus, embodiments of the present invention may provide advantages including, but not limited to, dynamically assigning a parking spot to a particular vehicle when that vehicle is in close proximity of the parking spot, guaranteeing an optimal vehicle parking assignment with respect to user preferences, and leveraging existing vehicle sensors to detect a vacant parking spot. The present invention does not require that all advantages need to be incorporated into every embodiment of the invention.

According to at least one embodiment, when one or more users are riding in a vehicle, one or more preferences regarding parking may be received from the one or more users. In response to determining the detector vehicle detects a vacant parking spot, a network of vehicles within a pre-defined threshold of the vacant parking spot may be created in order to notify each vehicle in the network of vehicles about the vacant parking spot. Upon receiving one or more requests for parking from one or more requestor vehicles in the network in response to the notification, real-time information associated with roads within the pre-defined threshold of the vacant parking spot may be identified so that the vacant parking spot may be assigned to a particular requestor vehicle in the network of vehicles based on the real-time information and the one or more preferences regarding parking. Upon assigning the vacant parking spot to the particular requestor vehicle, an indicator placed adjacent to the particular requestor vehicle that is assigned the vacant parking spot may be displayed. According to at least one embodiment, additional feedback may be received from the one or more users regarding one or more parking inconveniences. For example, the vacant parking spot may be too small for the particular requestor vehicle.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to create a network of vehicles within a pre-defined threshold of a vacant parking spot and, accordingly, assign the vacant parking spot to a particular vehicle based on real-time information and user preferences.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a vehicle-to-vehicle (V2V) network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a dynamic parking assignment program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a dynamic parking assignment program 110B and a database 116 and communicating with the client computing device 102 and IoT Device 118 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

In embodiments of the present invention where the communication network 114 is the V2V network, the dynamic parking assignment program 110A, 110B may be executed by the vehicles within the V2V network themselves, and does not require a dedicated server, such as the server 112. Thus, it may be appreciated that reference to the server 112 herein is not intended to be limiting, and that in embodiments of the present invention where the communication network 114 is the V2V network, the dynamic parking assignment program 110A, 110B may be executed by the vehicles within the V2V network.

IoT Device 118 may include a vehicle, a plurality of sensors embedded in or external to the vehicle, such as cameras, light detection and ranging (Lidars), and/or any other sensors known in the art for detecting objects and distances of objects that are capable of connecting to the communication network 114, and transmitting and receiving data with the client computing device 102 and the server 112.

According to the present embodiment, the dynamic parking assignment program 110A, 110B may be a program capable of receiving one or more preferences regarding parking from one or more users, creating a network of vehicles within a pre-defined threshold of a vacant parking spot, notifying each vehicle in the network of vehicles about the vacant parking spot, dynamically assigning the vacant parking spot to a particular vehicle when that vehicle is in close proximity of the parking spot, guaranteeing an optimal vehicle parking assignment with respect to user preferences, and leveraging existing vehicle sensors to detect the vacant parking spot. The dynamic parking assignment method is explained in further detail below with respect to FIG. 2.

Figure 2:
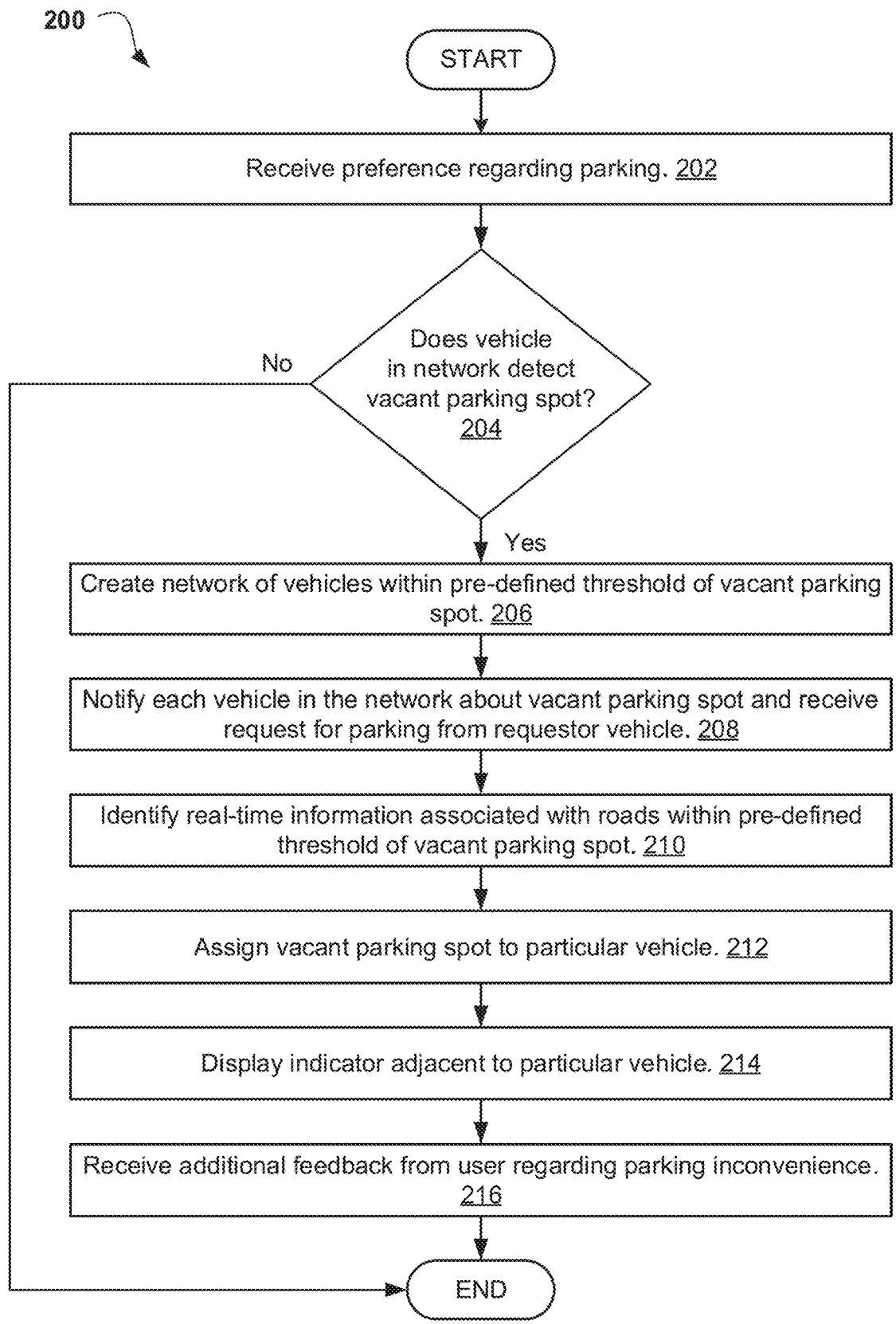
FIG. 2 illustrates an operational flowchart for dynamically assigning vehicle parking with user feedback in a sensor-equipped network in a dynamic vehicle parking assignment process according to at least one embodiment.

Referring now to FIG. 2, an operational flowchart for dynamically assigning vehicle parking with user feedback in a sensor-equipped network in a dynamic vehicle parking assignment process 200 is depicted according to at least one embodiment. At 202, the dynamic parking assignment program 110A, 110B receives the one or more preferences regarding parking from the one or more users. The one or more preferences may be received via a user interface (UI) on a display screen in the vehicle (e.g., an infotainment system in the vehicle). It may be appreciated that in embodiments of the present invention, the user may be either a human user or a non-human user. For example, the vehicle may be an autonomous vehicle that does not require input from the human user.

Examples of preferences include, but are not limited to, a maximum walking distance to a point of interest (POI), a preference for free or paid parking, a preference for covered or uncovered parking, a size of the parking spot, a preference for handicapped accessible parking, a preference for on-street parking or off-street parking (e.g., a parking garage), and/or any other parking preferences desired by the user. According to at least one embodiment, the one or more users may set an additional preference for a parking spot with an electric vehicle (EV) charger for those vehicles having an electric motor. The one or more users may also specify a power plug type and wattage for the EV charger. Thus, the parking spot may be either a parking spot with an EV charger or a parking spot without an EV charger based on the preference of the one or more users. According to at least one other embodiment, the one or more preferences may be customized by the one or more users. For example, the user may have a preference for covered parking during inclement weather conditions. In another example, the user may have a preference for a shorter maximum walking distance when it is cold outside or when there is a delay due to traffic conditions. This real-time information regarding weather and temperature may be used to optimize the assignment of the vacant parking spot, described in further detail below with respect to step 212.

Then, at 204, the dynamic parking assignment program 110A, 110B determines whether the detector vehicle detects the vacant parking spot. The detector vehicle may utilize a plurality of sensors, as described above, to detect the vacant parking spot. The plurality of sensors may be embedded in or external to the vehicle, and may include cameras, Lidars, and/or any other sensors known in the art for detecting objects and distances of objects. The detector vehicle may be a vehicle that is leaving a parking spot, or a vehicle that detects a vacant parking spot when driving by the parking spot.

According to at least one embodiment, the dynamic parking assignment program 110A, 110B may also determine whether the vacant parking spot includes the EV charger when at least one preference of the one or more preferences indicates the need for the EV charger, as described above with respect to step 202.

In response to determining the detector vehicle detects the vacant parking spot (step 204, "Yes" branch), the dynamic vehicle parking assignment process 200 proceeds to step 206 to create the network of vehicles within the pre-defined threshold of the vacant parking spot. In response to determining the detector vehicle does not detect the vacant parking spot (step 204, "No" branch), the dynamic vehicle parking assignment process 200 ends.

Figure 4:
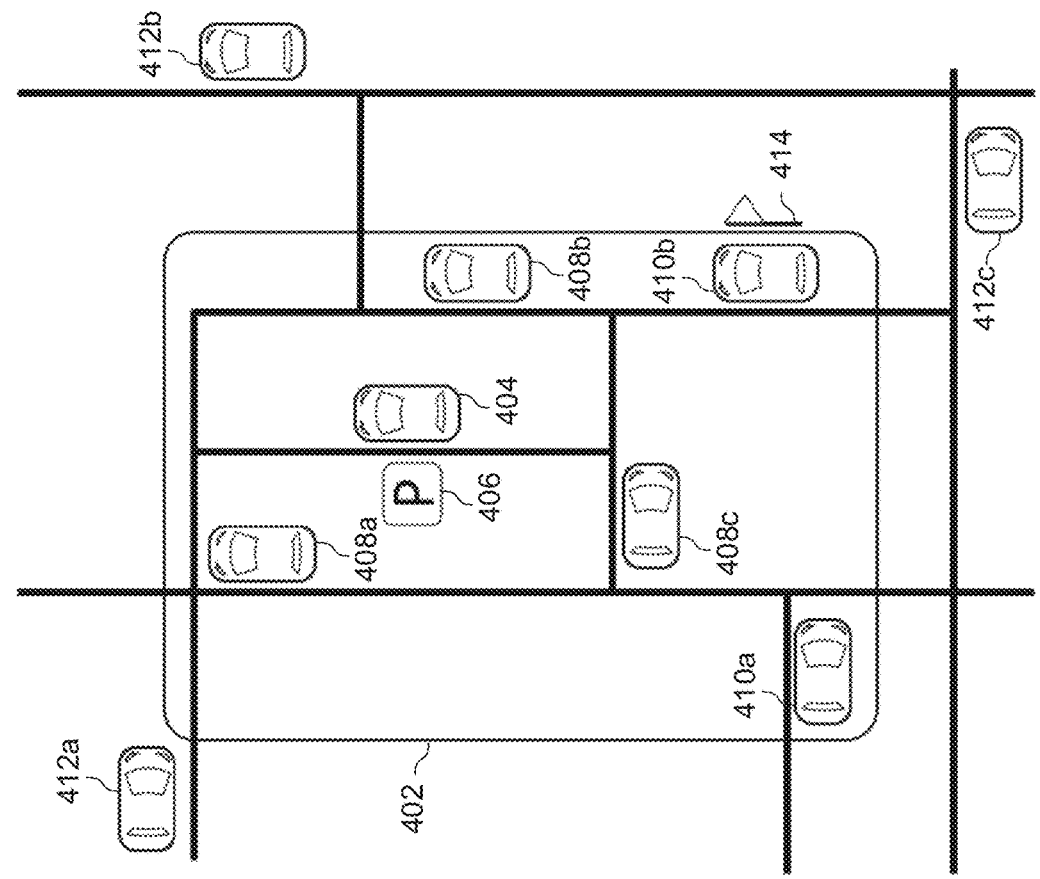
FIG. 4 is an exemplary diagram depicting a networked environment of vehicles according to at least one embodiment.

Next, at 206, the dynamic parking assignment program 110A, 110B creates the network of vehicles within the pre-defined threshold of the vacant parking spot. The network of vehicles may be a vehicle-to-vehicle (V2V) communication network that is reconfigured when any vehicle outside the network enters the network, and when any vehicle in the network leaves the network. For example, the network may dissolve when there are no vehicles within the pre-defined threshold and recover when as vehicles enter the pre-defined threshold. The networked environment is shown in FIG. 4 and is described in further detail below with respect to FIG. 4. The network may be created based on the topology of roads within the network. For example, the pre-defined threshold in a city environment where roads are placed closer together in a grid pattern may be less than the pre-defined threshold in a suburban environment where roads are spaced farther apart. For example, the pre-defined threshold may be within one mile (i.e., 1.6 km) of the vacant parking spot. In another example, the pre-defined threshold may be within five miles (i.e., 8.05 km) of the vacant parking spot. It may be appreciated that the examples described above are not intended to be limiting, and that in embodiments of the present invention the pre-defined threshold may be set to other distances.

Then, at 208, the dynamic parking assignment program 110A, 110B notifies each vehicle in the network of vehicles about the vacant parking spot. The notification may be sent by the detector vehicle over the V2V communication network or via other peer-to-peer (P2P) communication techniques. Since the network is confined to the pre-defined threshold of the vacant parking spot, vehicles outside the network, illustrated in FIG. 4 and described in further detail below with respect to the description of FIG. 4, do not receive the notification.

According to at least one embodiment, the notification may be an audio notification that the vacant parking spot is available. In this embodiment, the audio notification may also include the specific location of the vacant parking spot. According to at least one other embodiment, the notification may be a text notification displayed on the display screen of the vehicle. Similarly, in this embodiment, the text notification may also include the specific location of the vacant parking spot. For example, either the text or audio notification may state, "There is a vacant spot at the Northwest corner of E. 81$^{st}$ Street and Lexington Avenue."

In response to the notification, the dynamic parking assignment program 110A, 110B receives the one or more requests for parking from the one or more requestor vehicles in the network. The requestor vehicles are illustrated in FIG. 4 and are described in further detail below with respect to the description of FIG. 4. According to at least one embodiment, the dynamic parking assignment program 110A, 110B may prompt the one or more users to respond to the notification by asking the one or more users if they would like to request the vacant parking spot. According to at least one other embodiment, the one or more users may submit the requests without being prompted for a response to the notification.

According to at least one embodiment, the one or more users may submit the request for parking via the UI. For example, a pop-up on the UI may have a "Yes" button and a "No" button for whether the user would like to request the vacant parking spot. According to at least one other embodiment, the request may be an audio request. For example, the user may press the "talk button" in the vehicle and say, "I would like to request parking in the vacant parking spot."

According to at least one other embodiment, when the vehicle is an autonomous vehicle, the autonomous vehicle may submit the request for parking via the UI without input from the human user. For example, a navigation route programmed into the autonomous vehicle may guide the autonomous vehicle to a particular location, and the autonomous vehicle may submit the request when in the vicinity of the vacant parking spot.

Next, at 210, the dynamic parking assignment program 110A, 110B identifies the real-time information associated with roads within the pre-defined threshold of the vacant parking spot. Examples of real-time information may include, but are not limited to, weather conditions within the pre-defined threshold of the vacant parking spot (e.g., rain, snow, sleet, hail), the outside temperature within the pre-defined threshold, traffic conditions within the pre-defined threshold, and/or road closures within the pre-defined threshold. According to at least one embodiment, the real-time information may be identified in accordance with the one or more preferences of the one or more users described above with respect to step 202. For example, if the user sets a preference for a shorter maximum walking distance when it is cold outside or when there is a delay due to traffic conditions, the dynamic parking assignment program 110A, 110B may place an emphasis on these factors when assigning the vacant parking spot to the particular requestor vehicle, described in further detail below with respect to step 212.

Then, at 212, the dynamic parking assignment program 110A, 110B assigns the vacant parking spot to the particular requestor vehicle in the network of vehicles. The assignment is based on the real-time information described above with respect to step 210 and the one or more preferences described above with respect to step 202. For example, if the user sets a preference for covered parking when it is raining, the requestor vehicle carrying that user may not be assigned a vacant parking spot that is not covered. In another example, the user may set a maximum walking distance from a POI. In this example, the requestor vehicle carrying that user may not be assigned a vacant parking spot that is farther than this maximum walking distance. As described above with respect to FIG. 1, the dynamic parking assignment program 110A, 110B may be executed by each of the vehicles in the V2V network. In this manner, all of the vehicles in the V2V network may maintain an agreement with the assignment and do not dispute the assignment.

According to at least one embodiment, where there are multiple requests for the same vacant parking spot, the vacant parking spot may be assigned to the requestor vehicle that is closest to the vacant parking spot at the time of the request. Alternatively, the vacant parking spot may be assigned to the requestor vehicle having the highest priority for the vacant parking spot. For example, the requestor vehicle carrying an individual who needs a handicapped accessible parking spot may be given priority over other requestor vehicles in the network. According to at least one other embodiment, the vacant parking spot may be assigned on a first-come, first-served basis. For example, the requestor vehicle that is first to request the vacant parking spot may be assigned to the vacant parking spot.

According to at least one other embodiment, a timestamp of the assignment may be stored in a database, such as database 116 (e.g., 4:30 p.m.). In this embodiment, the dynamic parking assignment program 110A, 110B may require the particular requestor vehicle that is assigned the vacant parking spot to confirm successful parking within a designated time. For example, when the particular requester vehicle that is assigned the vacant parking spot does not confirm arrival at the vacant parking spot within the designated time, the dynamic parking assignment program 110A, 110B may withdraw the assignment from the particular requestor vehicle and may reassign the vacant parking spot to one of the other requestor vehicles.

However, in an interim period between the time of assignment and actual parking in the vacant parking spot by the particular requestor vehicle, there is a chance that the vacant parking spot may no longer be vacant. This may be due to either unreliable data from the detector vehicle, or another vehicle that does not participate in the network may have parked in the interim period before the arrival of the particular requestor vehicle. In instances where the vacant parking spot is taken by another vehicle, the dynamic parking assignment program 110A, 110B reverts back to an initial state where a detector vehicle once again is tasked with finding a vacant parking spot.

Next, at 214, the dynamic parking assignment program 110A, 110B displays the indicator placed adjacent to the particular requestor vehicle that is assigned the vacant parking spot. The indicator may be displayed on the display screen of the vehicle. As illustrated in FIG. 4 and described in further detail below with respect to the description of FIG. 4, the indicator that is placed adjacent to the particular requestor vehicle may be a flag indicator that is displayed to all vehicles in the network of vehicles. In this manner, all the vehicles in the network have the same information regarding the assignment and do not dispute the assignment.

Then, at 216, the dynamic parking assignment program 110A, 110B receives additional feedback from the one or more users regarding one or more parking inconveniences. The additional feedback may be received via the UI by text or audio. Examples of additional feedback include, but are not limited to, feedback that the vacant parking spot is too small, feedback that the vacant parking spot is occupied by a vehicle outside the network, and/or feedback that the vacant parking spot is blocked by a non-vehicular object (e.g., a cone or construction equipment). The additional feedback may be submitted manually by a human or automatically by the vehicle. The feedback may be used to determine the effectiveness of the assignments and reconfigure the assignment parameters if necessary.

Figure 3:
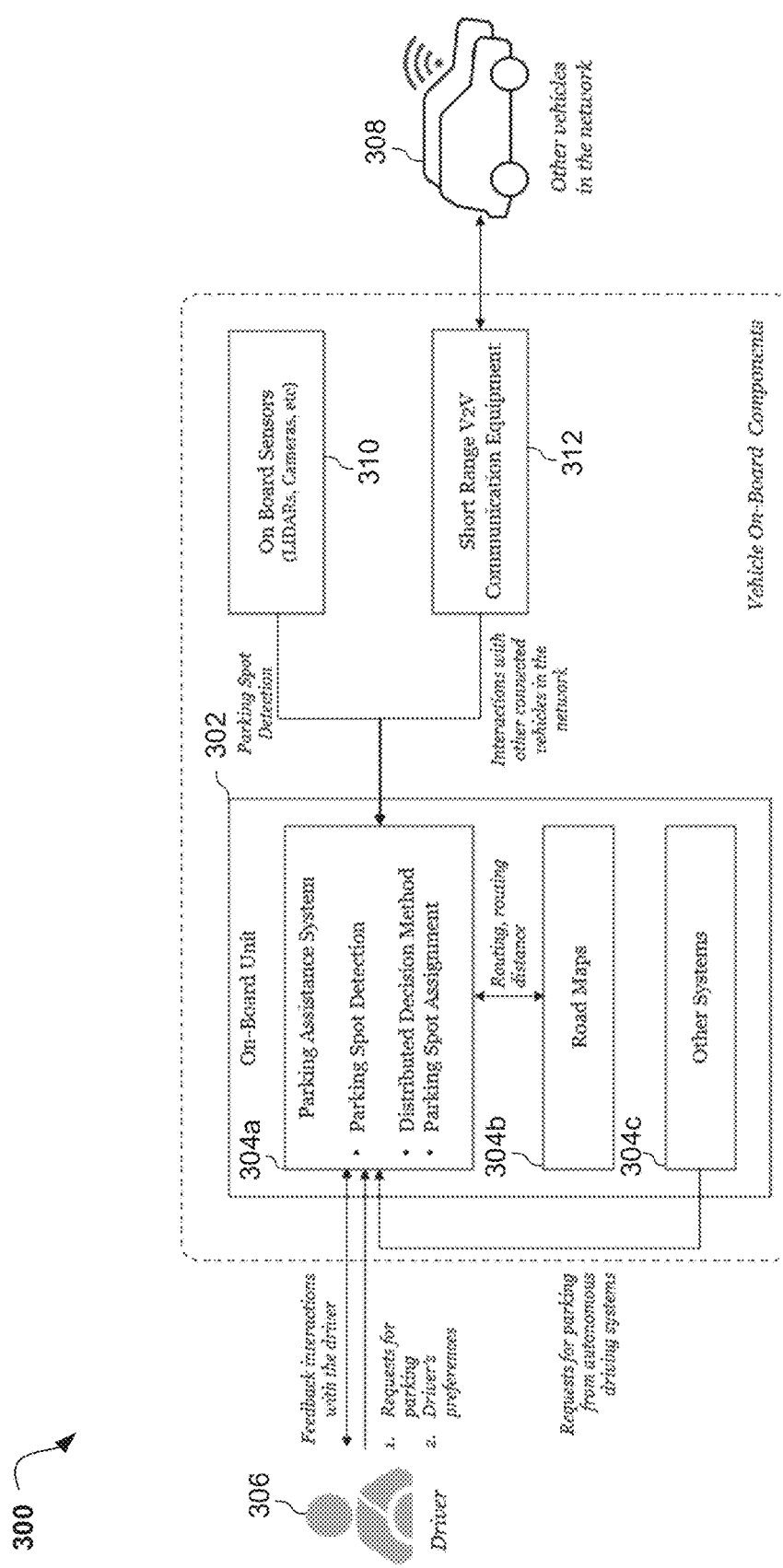
FIG. 3 is a diagram depicting an interaction between solution components of the process in FIG. 2 according to at least one embodiment.

Referring now to FIG. 3, a diagram 300 depicting an interaction between solution components of the process in FIG. 2 is shown according to at least one embodiment. In the diagram 300, an on-board unit 302 comprises a parking assistance system 304a, road maps 304b, and other systems 304c. The parking assistance system 304a may include parking spot detection, and a distributed decision method for parking spot assignment. The parking assistance system 304a may be in communication with the road maps 304b, such as maps in a GPS system. The road maps 304b may provide the topology of roads within the pre-defined threshold of the vacant parking spot and allow for routing to the vacant parking spot. The other systems 304c may include requests for parking from autonomous vehicles. According to at least one embodiment, a driver 306 (e.g., a human driver) may interact with the parking assistance system 304a of the on-board unit 302. The feedback may include requests for parking and preferences from the driver 306 and/or the other systems 304c. As described above with respect to FIG. 2, other vehicles 308 in the network of vehicles may have a plurality of on-board sensors 310 (e.g., cameras and/or Lidars) and short range V2V communication equipment 312. The on-board sensors 310 may be used for vacant parking spot detection, and the short range V2V communication equipment 312 allows for direct communication among all the vehicles in the network. As shown in the diagram 300, the on-board sensors 310 and the short range V2V communication equipment 312 may be in communication with the parking assistance system 304a of the on-board unit 302.

Referring now to FIG. 4, an exemplary diagram 400 depicting a networked environment of vehicles is shown according to at least one embodiment. In the diagram 400, the networked environment 402 may comprise at least one detector vehicle 404 that is able to detect the vacant parking spot 406, one or more member vehicles 408a, 408b, 408c, each of which may also serve as the detector vehicle 404, and one or more requestor vehicles 410a, 410b. One or more other vehicles 412a, 412b, 412c may be located outside the networked environment 402 and do not communicate with the vehicles 404, 408a-408c, 410a-410b in the networked environment 402. However, as described above with respect to FIG. 2, the one or more other vehicles 412a, 412b, 412c may join the networked environment 402 based on whether these one or more other vehicles 412a, 412b, 412c enter the pre-defined threshold of the vacant parking spot 406. The vacant parking spot 406 may be assigned to the particular requestor vehicle 410b as described above with respect to FIG. 2. In embodiments of the present invention, the particular requestor vehicle 410b may be the "winner" out of the one or more requestor vehicles 410a, 410b that requested to park in the vacant parking spot 406. The flag indicator 414 may be placed adjacent to the particular requestor vehicle 410b and displayed to all the vehicles 404, 408a-408c, 410a-410b in the networked environment 402.

It may be appreciated that FIGS. 2-4 provide only an illustration of one implementation and do not imply any limitations with regard to how different embodiments may be implemented. Many modifications to the depicted environments may be made based on design and implementation requirements.

Figure 5:
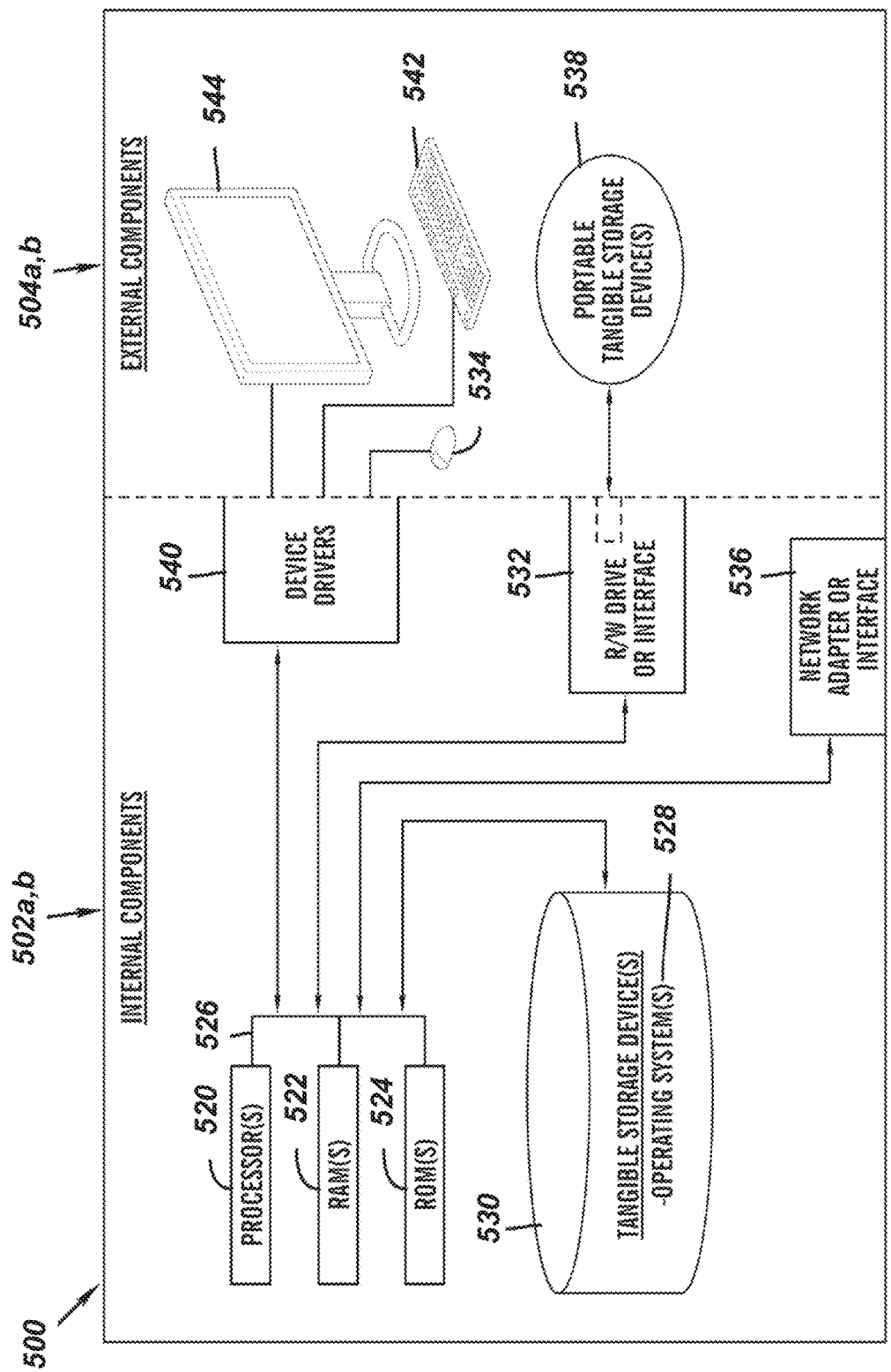
FIG. 5 is a functional block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the dynamic parking assignment program 110A in the client computing device 102 and the dynamic parking assignment program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the dynamic parking assignment program 110A, 110B, can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the dynamic parking assignment program 110A in the client computing device 102 and the dynamic parking assignment program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the dynamic parking assignment program 110A in the client computing device 102 and the dynamic parking assignment program 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
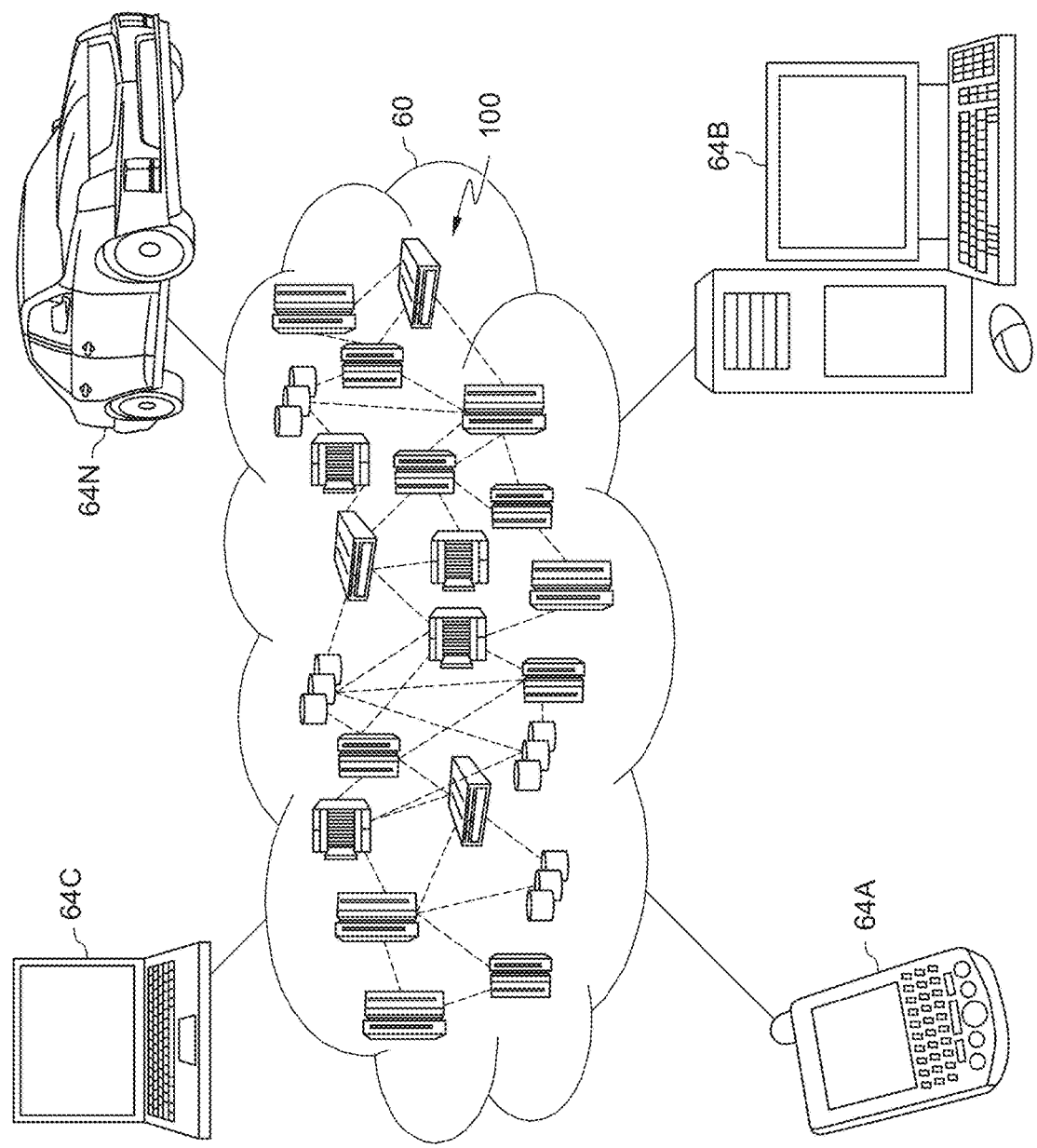
FIG. 6 depicts a cloud computing environment according to an embodiment of the present invention.

Referring now to FIG. 6, illustrative cloud computing environment 60 is depicted. As shown, cloud computing environment 60 comprises one or more cloud computing nodes 100 with which local computing devices used by cloud consumers, such as, for example, personal digital assistant (PDA) or cellular telephone 64A, desktop computer 64B, laptop computer 64C, and/or automobile computer system 64N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 6 are intended to be illustrative only and that computing nodes 100 and cloud computing environment 60 can communicate with any type of computerized device over any type of network and/or network addressable connection (e.g., using a web browser).

Figure 7:
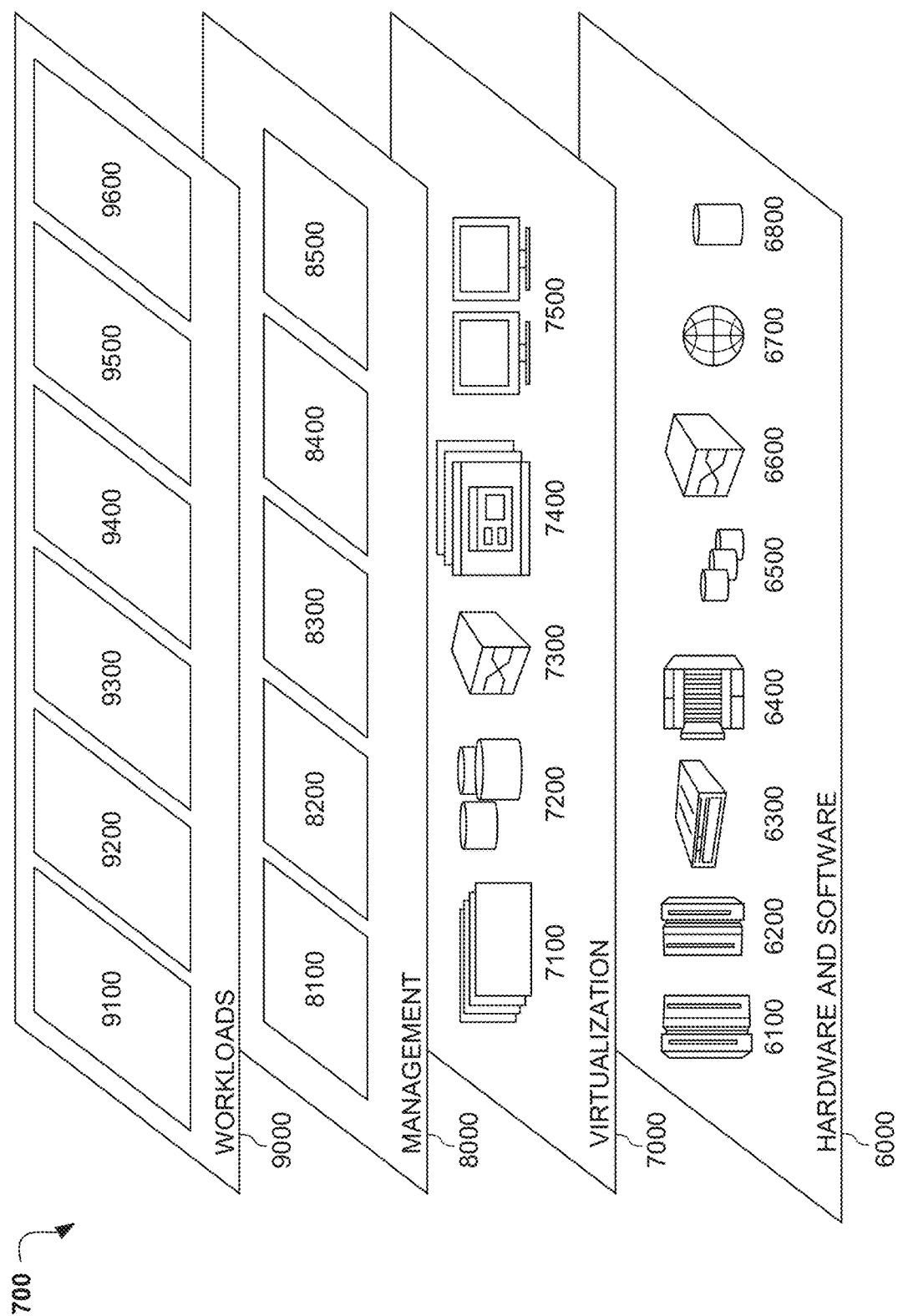
FIG. 7 depicts abstraction model layers according to an embodiment of the present invention.

Referring now to FIG. 7, a set of functional abstraction layers 700 provided by cloud computing environment 60 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 6000 includes hardware and software components. Examples of hardware components include: mainframes 6100; RISC (Reduced Instruction Set Computer) architecture based servers 6200; servers 6300; blade servers 6400; storage devices 6500; and networks and networking components 6600. In some embodiments, software components include network application server software 6700 and database software 6800.

Virtualization layer 7000 provides an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 provides dynamic procurement of computing resources and other resources that are utilized to perform tasks within the cloud computing environment. Metering and Pricing 8200 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 8300 provides access to the cloud computing environment for consumers and system administrators. Service level management 8400 provides cloud computing resource allocation and management such that required service levels are met. Service Level Agreement (SLA) planning and fulfillment 8500 provide pre-arrangement for, and procurement of, cloud computing resources for which a future requirement is anticipated in accordance with an SLA.

Workloads layer 9000 provides examples of functionality for which the cloud computing environment may be utilized. Examples of workloads and functions which may be provided from this layer include: mapping and navigation 9100; software development and lifecycle management 9200; virtual classroom education delivery 9300; data analytics processing 9400; transaction processing 9500; and dynamic vehicle parking assignment with user feedback 9600. Dynamic vehicle parking assignment with user feedback 9600 may relate to creating a network of vehicles within a pre-defined threshold of a vacant parking spot in order to assign the vacant parking spot to a particular vehicle based on real-time information and user preferences.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of dynamically assigning vehicle parking, the method comprising:
    receiving one or more preferences regarding parking from one or more users;
    determining whether a detector vehicle detects a vacant parking spot;
    in response to determining the detector vehicle detects the vacant parking spot, creating a network of vehicles within a pre-defined threshold of the vacant parking spot, wherein the network is a vehicle-to-vehicle (V2V) communication network that is reconfigured when any vehicle outside the network enters the network, and when any vehicle in the network leaves the network, and wherein the pre-defined threshold is determined based on a topology of roads within the network;
    notifying each vehicle in the network of vehicles about the vacant parking spot;
    receiving one or more requests for parking from one or more requestor vehicles in the network in response to the notification;
    identifying real-time information associated with the roads within the pre-defined threshold of the vacant parking spot;
    assigning the vacant parking spot to a particular requestor vehicle based on the network of vehicles based on the real-time information and the one or more preferences regarding parking, wherein in response to determining at least one other vehicle outside the network is already occupying the vacant parking spot, causing the detector vehicle to find an alternative vacant parking spot; and
    displaying an indicator placed adjacent to the particular requestor vehicle that is assigned the vacant parking spot.

2. The computer-based method of claim 1, further comprising:
    receiving additional feedback from the one or more users regarding one or more parking inconveniences.

3. The computer-based method of claim 1, wherein the pre-defined threshold is within one mile of the vacant parking spot.

4. The computer-based method of claim 1, wherein the indicator placed adjacent to the particular requestor vehicle is a flag indicator displayed to all vehicles in the network of vehicles.

5. The computer-based method of claim 1, wherein determining whether the detector vehicle detects the vacant parking spot further comprises:
    determining whether the vacant parking spot includes an electric vehicle (EV) charger when at least one preference of the one or more preferences indicates a need for the EV charger.

6. The computer-based method of claim 2, wherein the additional feedback is selected from a group consisting of feedback that the vacant parking spot is too small, feedback that the vacant parking spot is occupied by a vehicle outside the network, and feedback that the vacant parking spot is blocked by a non-vehicular object.

7. A computer system, the computer system comprising:
    one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
    receiving one or more preferences regarding parking from one or more users;
    determining whether a detector vehicle detects a vacant parking spot;
    in response to determining the detector vehicle detects the vacant parking spot, creating a network of vehicles within a pre-defined threshold of the vacant parking spot, wherein the network is a vehicle-to-vehicle (V2V) communication network that is reconfigured when any vehicle outside the network enters the network, and when any vehicle in the network leaves the network, and wherein the pre-defined threshold is determined based on a topology of roads within the network;
    notifying each vehicle in the network of vehicles about the vacant parking spot;
    receiving one or more requests for parking from one or more requestor vehicles in the network in response to the notification;
    identifying real-time information associated with the roads within the pre-defined threshold of the vacant parking spot;
    assigning the vacant parking spot to a particular requestor vehicle based on the network of vehicles based on the real-time information and the one or more preferences regarding parking, wherein in response to determining at least one other vehicle outside the network is already occupying the vacant parking spot, causing the detector vehicle to find an alternative vacant parking spot; and
    displaying an indicator placed adjacent to the particular requestor vehicle that is assigned the vacant parking spot.

8. The computer system of claim 7, further comprising:
    receiving additional feedback from the one or more users regarding one or more parking inconveniences.

9. The computer system of claim 7, wherein the pre-defined threshold is within one mile of the vacant parking spot.

10. The computer system of claim 7, wherein the indicator placed adjacent to the particular requestor vehicle is a flag indicator displayed to all vehicles in the network of vehicles.

11. The computer system of claim 7, wherein determining whether the detector vehicle detects the vacant parking spot further comprises:
   determining whether the vacant parking spot includes an electric vehicle (EV) charger when at least one preference of the one or more preferences indicates a need for the EV charger.

12. The computer system of claim 8, wherein the additional feedback is selected from a group consisting of feedback that the vacant parking spot is too small, feedback that the vacant parking spot is occupied by a vehicle outside the network, and feedback that the vacant parking spot is blocked by a non-vehicular object.

13. A computer program product, the computer program product comprising:
   one or more computer-readable tangible storage medium and program instructions stored on at least one of the one or more computer-readable tangible storage medium, the program instructions executable by a processor capable of performing a method, the method comprising:
   receiving one or more preferences regarding parking from one or more users;
   determining whether a detector vehicle detects a vacant parking spot;
   in response to determining the detector vehicle detects the vacant parking spot, creating a network of vehicles within a pre-defined threshold of the vacant parking spot, wherein the network is a vehicle-to-vehicle (V2V) communication network that is reconfigured when any vehicle outside the network enters the network, and when any vehicle in the network leaves the network, and wherein the pre-defined threshold is determined based on a topology of roads within the network;
   notifying each vehicle in the network of vehicles about the vacant parking spot;
   receiving one or more requests for parking from one or more requestor vehicles in the network in response to the notification;
   identifying real-time information associated with the roads within the pre-defined threshold of the vacant parking spot;
   assigning the vacant parking spot to a particular requestor vehicle based on the network of vehicles based on the real-time information and the one or more preferences regarding parking, wherein in response to determining at least one other vehicle outside the network is already occupying the vacant parking spot, causing the detector vehicle to find an alternative vacant parking spot; and
   displaying an indicator placed adjacent to the particular requestor vehicle that is assigned the vacant parking spot.

14. The computer program product of claim 13, further comprising:
   receiving additional feedback from the one or more users regarding one or more parking inconveniences.

15. The computer program product of claim 13, wherein the pre-defined threshold is within one mile of the vacant parking spot.

16. The computer program product of claim 13, wherein the indicator placed adjacent to the particular requestor vehicle is a flag indicator displayed to all vehicles in the network of vehicles.

17. The computer program product of claim 13, wherein determining whether the detector vehicle detects the vacant parking spot further comprises:
   determining whether the vacant parking spot includes an electric vehicle (EV) charger when at least one preference of the one or more preferences indicates a need for the EV charger.

* * * * *